Nov. 3, 1925.
L. JAENICHEN
SCALE
Filed Feb. 18, 1922
1,559,755
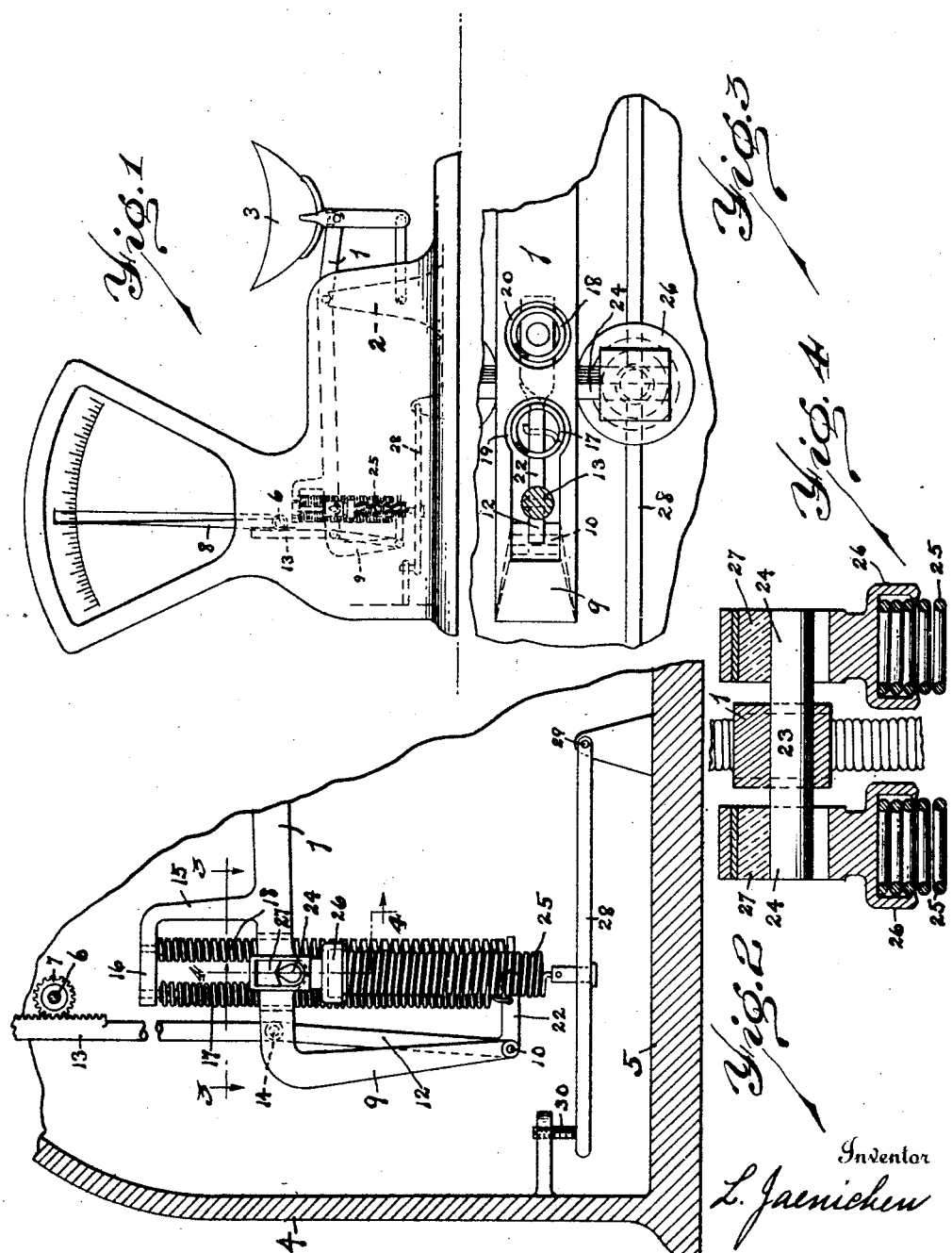
Inventor
L. Jaenichen
By Edward N. Pagelsen
Attorney Patented Nov. 3, 1925.

1,559,755

UNITED STATES PATENT OFFICE.

LOUIS JAENICHEN, OF DETROIT, MICHIGAN, ASSIGNOR TO THE STANDARD COMPUTING SCALE COMPANY, OF DETROIT, MICHIGAN, A CORPORATION OF MICHIGAN.

SCALE.

Application filed February 18, 1922. Serial No. 537,442.

*To all whom it may concern:*

Be it known that I, LOUIS JAENICHEN, a citizen of the United States, and residing at Detroit, in the county of Wayne and State of Michigan, have invented a new and Improved Scale, of which the following is a specification.

This invention relates to that type of weighing scales in which the load is resisted by springs, and indicators are moved through greater or less distances according to the loads on the scales, and its object is to provide means for compensating for the decrease in the stiffness of the load-resisting springs because of increases in temperature and to compensate for the initial variations in length of these springs because of such change in temperature.

This invention consists in a compensating lever connected to the main scale beam and to the weight indicator together with means affected by the temperature in the same manner as the load resisting springs for swinging this lever so as to reduce the effective length of that arm of the scale beam to which the indicator is connected, in proportion to the reduction in stiffness of the load resisting springs, and at the same time, so swing this lever that the movement of the weight indicator caused by the variation in length of the load resisting springs because of the difference in temperature will be compensated. It also consists in the details of construction indicated in the accompanying drawing and particularly pointed out in the claims.

In the accompanying drawing, Fig. 1 is a side elevation of a scale embodying the present invention. Fig. 2 is a section of one portion of the scale parallel to the plane of Fig. 1. Figures 3 and 4 are sections in the lines 3—3 and 4—4 respectively of Fig. 2.

Similar reference characters refer to like parts throughout the several views.

The scale shown is of the single beam type in which the load carrying beam 1 is mounted on a pedestal 2 and supports a load-receiving pan 3 at one end. Within the case 4, which has a base 5, is a small shaft 6 to which a gear 7 and an indicator 8 are attached. The beam has a down-turned arm 9 carrying a pivot 10 for a compensating lever, whose long arm 12 connects to a rack bar 13 by means of a pin 14, and the rack bar meshes with the gear 7.

Extending upward from the beam 1 is an arm 15 having an extension 16 to which means are connected which vary in length with the variations in temperature, preferably the light tension spring 17 and the stiffer compression spring 18, which springs act as one element. As shown in Fig. 3, these springs extend through openings 19 and 20 in the beam 1 and connect to the short arm 22 of the compensating lever. A rod of metal may be substituted for the springs but springs are preferred because of their more perfect response to changes in temperature, the reason probably being that the metal of which they are made is affected in the same way as is the metal of the load-resisting springs 25 when the springs are wound. The tension spring 17 merely acts to keep the spring 18 in compression. A pin 23 is mounted in the beam 1 and is formed into a knife edge pivot 24 at one or both sides of the beam, according as one or two load-resisting springs 25 are employed. Caps 26 connect to the upper ends of the springs 25 and carry agates 27 which rest on the knife edges. The lower end of each spring 25 may connect to a bar 28 positioned by the pivot 29 and the adjusting screw 30 by means of which the initial positions of the knife-edge pivots 29 are determined.

The two arms of the beam 1 expand and contract in the same proportion with changes of temperature so the load leverage remains the same. But the spring 25 expands with increasing temperature and at the same time becomes weaker so that it expands greater distances under the same loads. The spring 18 is under substantially constant load so that it expands in proportion to the increases in temperature or according to the decrease in stiffness of the spring 25 and swings the pivot 14 toward the pivot of the beam 1 to decrease the lever arm of the rack bar 13 as the temperature increases. The movement of the rack bar 13 under equal loads on the scale pan 3 is therefore the same for all temperatures.

The initial expansion of the spring 25 because of increased temperature permits the beam 1 and pivot 14 to rise and the rack bar turns back the indicator 8. But the arm 12 of the compensating lever is at an angle to the vertical so that the initial expansion of the spring 18 will swing down the pivot 14 and the rack bar and thus counterbalance the initial movement caused by the spring 25.

These proportions and details of the several parts may all be changed by skilled scale makers to suit varying conditions without departing from the spirit of my invention as set forth in the following claims.

I claim:—

1. In a scale, the combination of a load carrying beam, a spring connected thereto to resist the load, a compensating lever pivoted to the beam substantially parallel to the load resisting spring, a spring mounted on the beam to swing the lever according to changes in temperature, and a weight indicator connected to said lever and actuated thereby.

2. In a scale, the combination of a load carrying beam, a load resisting spring connected to the beam, a weight indicator, a bar to actuate the indicator, a lever connected to the beam and to said bar, and a pair of springs substantially parallel to the load resisting springs mounted on the beam and connected to the lever to swing the same according to changes in temperature and thus change the rate of movement of the weight indicator.

3. In a scale, the combination of a load carrying beam, a load resisting spring connected to the beam, a weight indicator, a bar to actuate the indicator, a lever connected to the beam and to said bar, and a spring of greater length than the load resisting spring and parallel thereto mounted on the beam and connected to the lever to swing the same according to changes in temperature and thus move the bar toward the beam with increased temperature.

4. In a scale, the combination of a load carrying beam, a load resisting spring connected thereto, an arm connected at one end to the beam, a weight indicator connected to the opposite end of said arm, and a tension and a compression spring mounted on said beam and connected to said arm and affected by the temperature for causing the effective leverage of the point of connection of the weight indicator and said arm to be varied inversely with the changes in temperature.

5. In a scale, the combination of a load carrying beam, means to resist the load thereon, a compensating lever pivoted to the beam, a weight indicator connected to the lever and actuated thereby, and a coil spring of a single metal connected to the beam and to said lever to swing the lever according to changes of temperature.

LOUIS JAENICHEN.